L. GROTE.
GLASS BLOWING MACHINE.
APPLICATION FILED NOV. 21, 1908.

1,004,020.

Patented Sept. 26, 1911.
5 SHEETS—SHEET 1.

L. GROTE.
GLASS BLOWING MACHINE.
APPLICATION FILED NOV. 21, 1908.

1,004,020.

Patented Sept. 26, 1911.
5 SHEETS—SHEET 2.

L. GROTE.
GLASS BLOWING MACHINE.
APPLICATION FILED NOV. 21, 1908.

1,004,020.

Patented Sept. 26, 1911.

5 SHEETS—SHEET 3.

L. GROTE.
GLASS BLOWING MACHINE.
APPLICATION FILED NOV. 21, 1908.
1,004,020.
Patented Sept. 26, 1911.
5 SHEETS—SHEET 4.
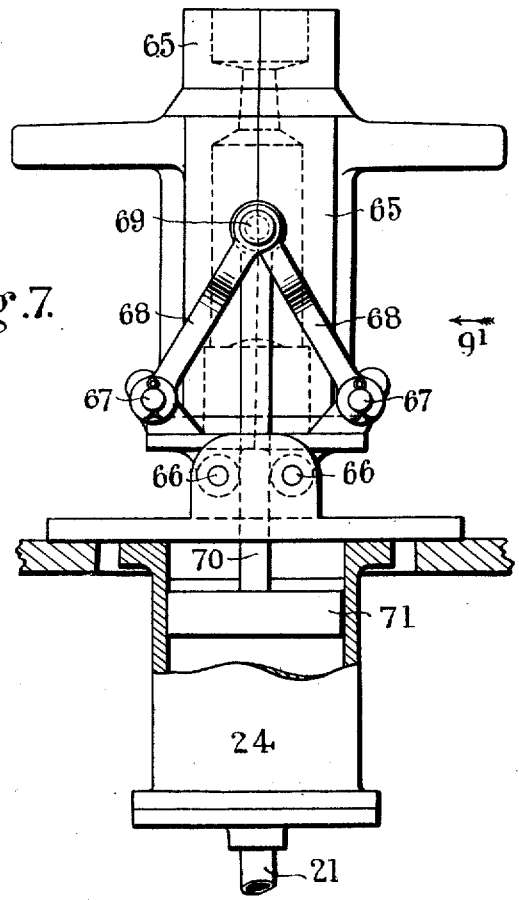
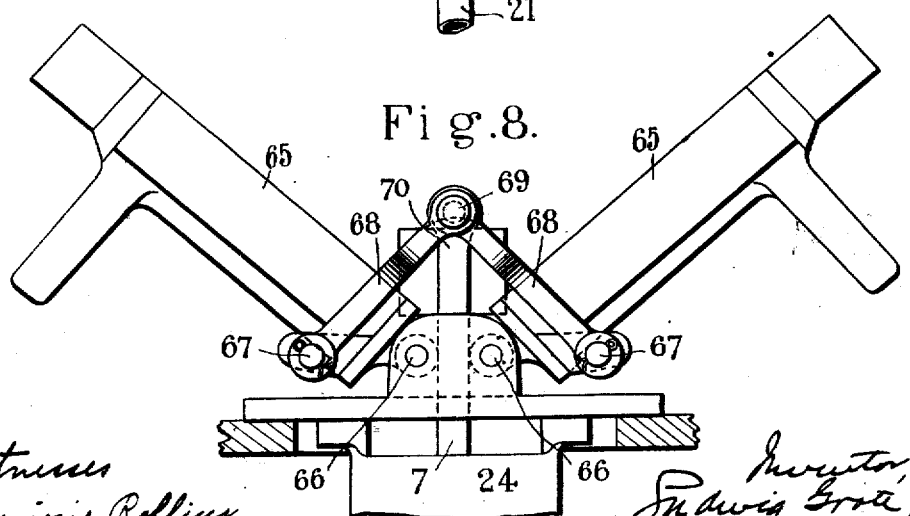

L. GROTE.
GLASS BLOWING MACHINE.
APPLICATION FILED NOV. 21, 1908.
1,004,020.
Patented Sept. 26, 1911.
5 SHEETS—SHEET 5.
Fig.12.
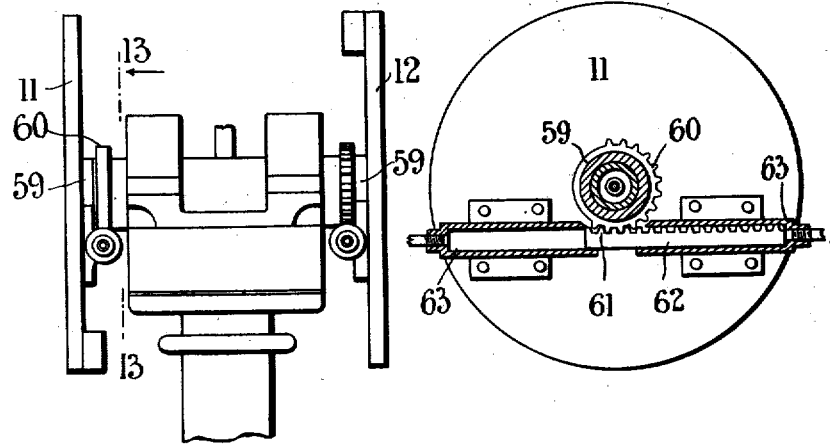
Fig.13.
Fig.11.
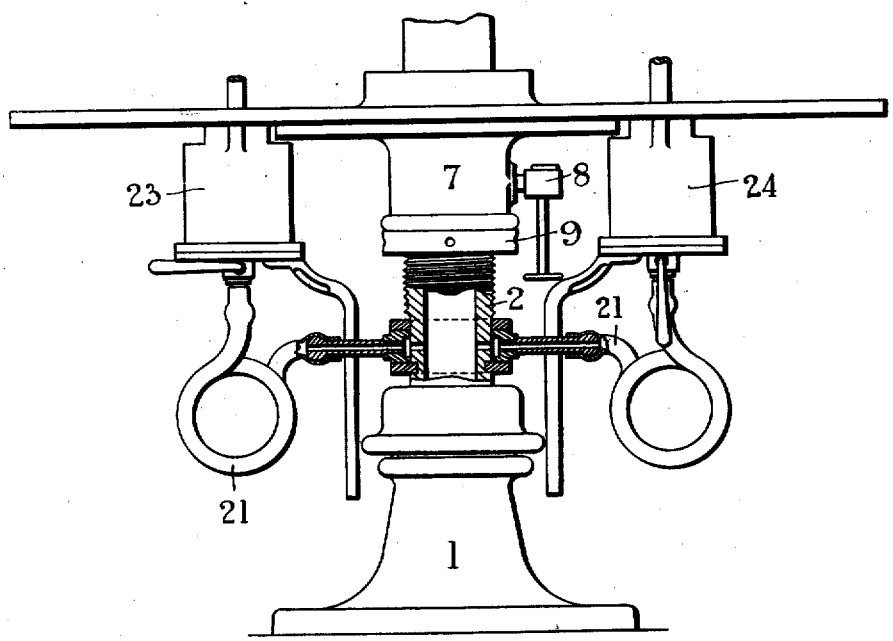
Witnesses
Marjorie Rollins
G. McGrann
Inventor
Ludwig Grote
by Kaale Wendell Varney
Attys.

UNITED STATES PATENT OFFICE.

LUDWIG GROTE, OF LONDON, ENGLAND, ASSIGNOR TO AVANDO WARREN HUSSEY VIVIAN AND GEORGE LLEWELLYN DAVIES, BOTH OF LONDON, ENGLAND.

GLASS-BLOWING MACHINE.

1,004,020.   Specification of Letters Patent.   Patented Sept. 26, 1911.

Application filed November 21, 1908. Serial No. 463,745.

*To all whom it may concern:*

Be it known that I, LUDWIG GROTE, engineer, a subject of the Emperor of Germany, residing at 177 Mount Pleasant road, Tottenham, London, England, have invented certain new and useful Improvements in Glass-Blowing Machines, of which the following is a specification.

The present invention relates to glass blowing machines for blowing hollow objects—and especially glass bottles—in molds; the construction of this machine rendering it suitable for operation by any person even if unskilled in the art of glass blowing.

The invention comprises a number of neck molds and parison-molds arranged on plates or supports rotatable in vertical planes, and a number of finishing molds arranged on a work-table or support rotatable in a horizontal plane, and pneumatic means which alone operate the neck, parison and finishing molds to open and close the same independently and when required; advantageously by the air pressure acting upon pistons in cylinders, the movement of the pistons being transmitted by suitable means for example either by toothed sectors or through pairs of toggle joints to the parts of the divided molds.

I will now proceed to fully describe this invention with reference to the accompanying drawings in which:—

Figure 1:
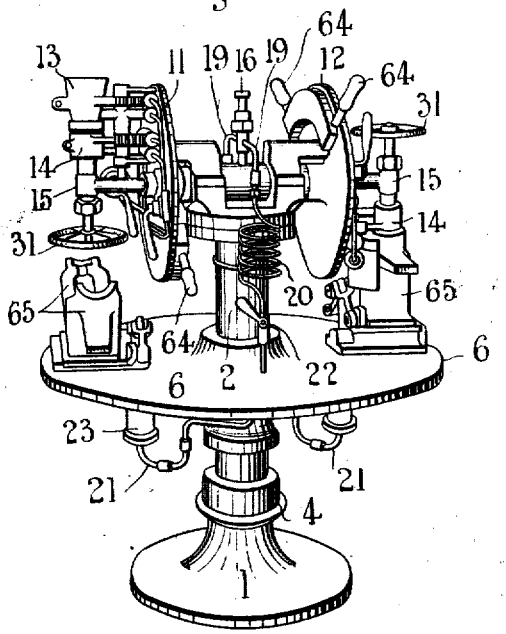
Figure 10:
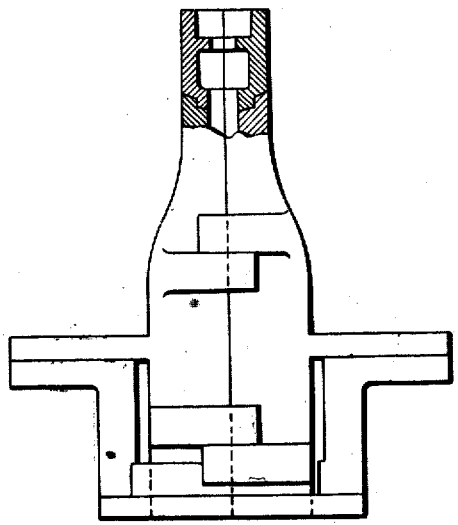
Figure 9:
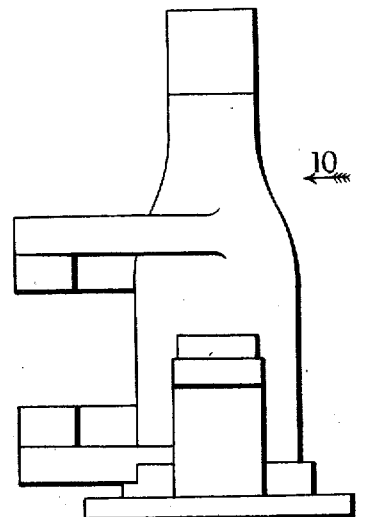
Figure 2:
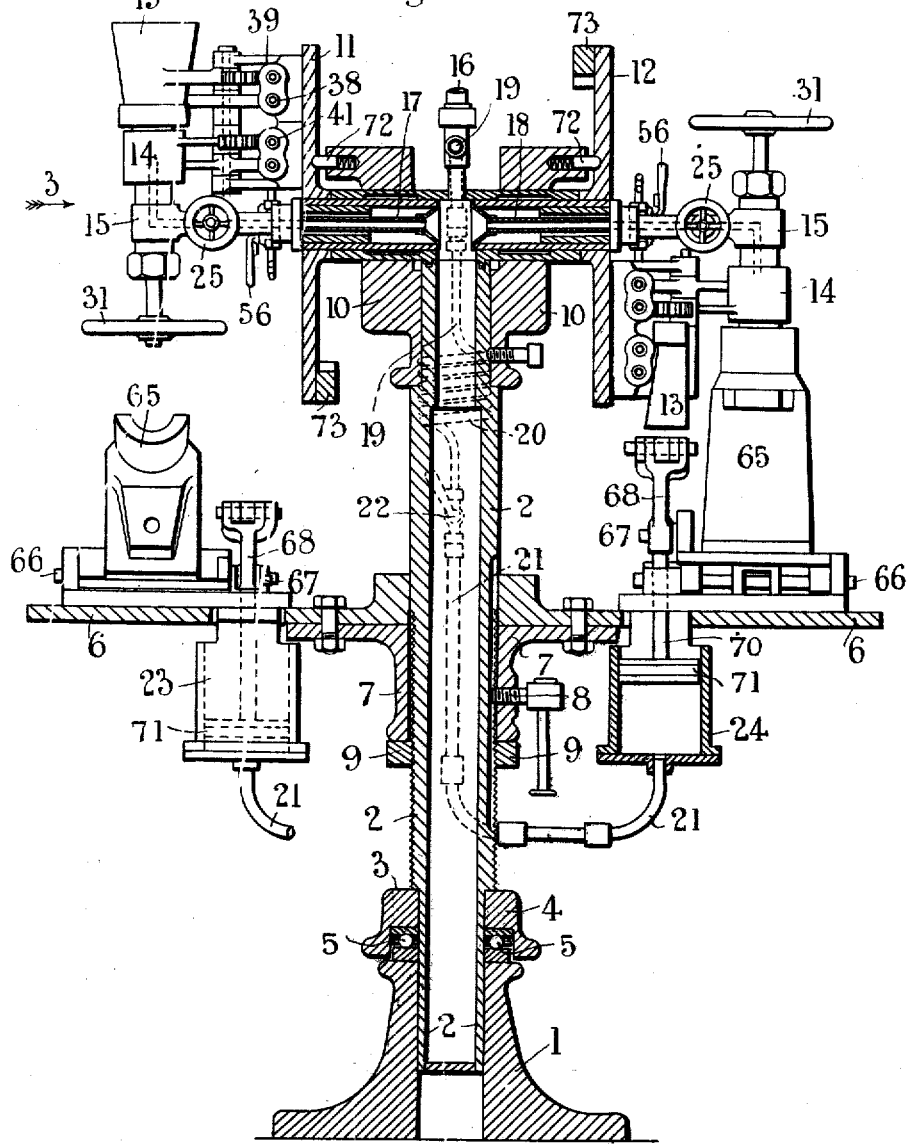
Figure 3:
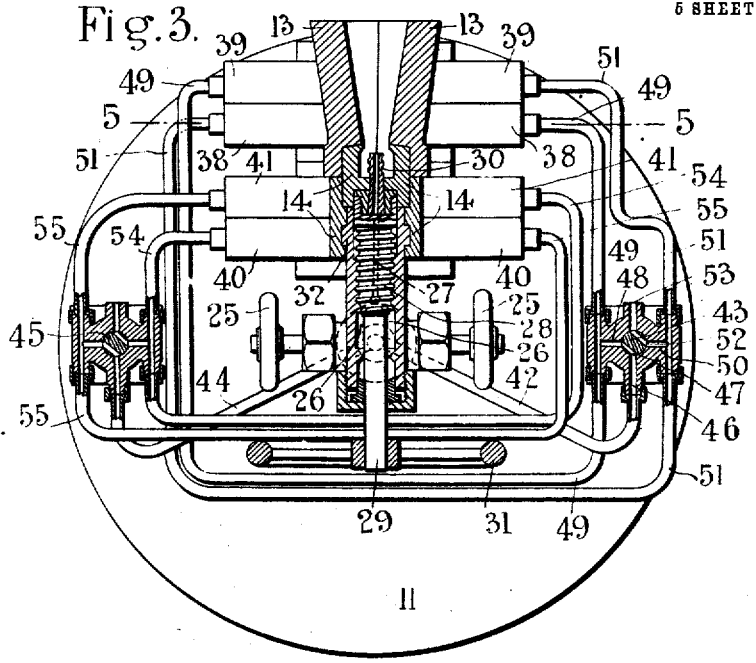
Figure 4:
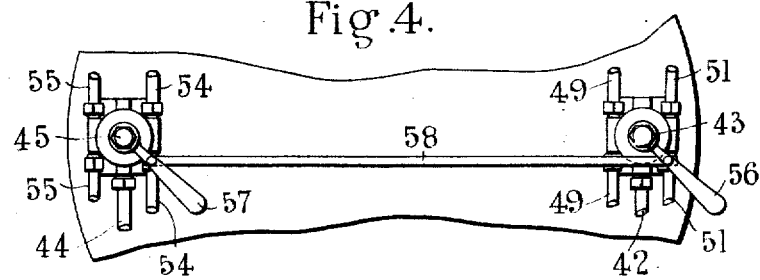
Figure 5:
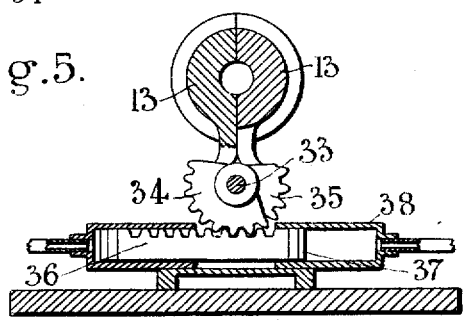
Figure 6:
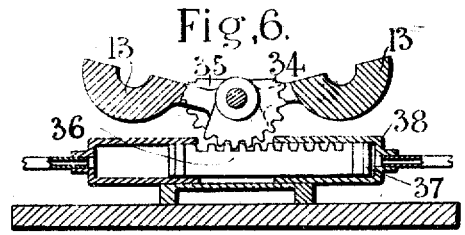

Figure 1 is a perspective view of a glass bottle blowing machine with pneumatic means for opening and closing the molds according to the present invention. Fig. 2 is a view on an enlarged scale of a glass bottle blowing machine according to the present invention partly in vertical section taken through the center of the machine; while the various molds in said machine are shown in elevation. Fig. 3 is a local view in elevation (on an enlarged scale) looking in the direction of the arrow 3 (Fig. 2) of one of the plates or supports rotatable in a vertical plane with the neck mold and parison mold thereon and the nozzle device and the core or mandrel and its operating parts all shown in vertical section and showing the arrangement of pneumatic cylinders and air pipes and valves carried on said plate or support with the air valves shown in vertical section. Fig. 4 is a local view of Fig. 3— showing said air valves in elevation. Fig. 5 is a cross-sectional view on the line 5—5 Fig. 3 *i. e.* through the parison mold which is shown in the closed position. Fig. 6 is similar view to Fig. 5 but showing the two halves of the parison mold in the open position. Fig. 7 is a local view in elevation (also on an enlarged scale) of the finishing mold in the closed position; Fig. 8 is view in the open position. Fig. 9 is a side view in elevation of a modified form of finshing mold namely Fig. 9 shows an ordinary type of finishing mold with the halves of the mold provided with vertical hinges adapted to be hinged to vertical hinge pins, so that the halves swing open in a horizontal plane when used in the ordinary way which molds can be utilized as finishing molds on this machine by removing the vertical hinge-pins and hinging the two parts on horizontal pins so that the mold parts open and close as in Figs. 1 and 2 and 7 and 8. Fig. 10 is a view at right angles to Fig. 9 *i. e.* looking in the direction of the arrow 9 Fig. 8; with the top of the finishing mold in section to show the arrangement thereof for fitting on to the neck mold. Fig. 11 is a local view of the lower part of the apparatus *i. e.* showing the horizontal rotatable table and the part of the machine below same the said lower part being shown in section to illustrate a modification in the method of conducting the air under pressure to the cylinders for operating the finishing molds. Fig. 12 is a local view of the central upper part of the machine showing the two plates or supports rotatable in vertical planes with pneumatic means for imparting a rotary movement to each said plate respectively. Fig. 13 is a local view taken between the two said plates on the line 13—13 Fig. 12 looking in the direction of the arrow in said Fig. 12.

1 is the foot or bottom support of the machine in which is provided a step-bearing for the vertical supporting column 2 which latter may advantageously be supported on ball bearings by means of the annular shoulder 3 resting on the collar 4 which latter is supported on the balls 5 in the ball-race in said ball-bearing while the lowermost part of the column 2 is free to rotate within the foot 1.

The vertical column 2 illustrated in Fig. 2 is tubular and closed at the top and bottom ends.

The horizontal work-table or support 6 for the finishing molds is adapted to be adjusted vertically and fixed at any desired height upon the vertical central column 2 as for example said table 6 may have a downwardly extending collar or tubular portion 7 provided with a set screw such as the screw 8 with handle thereto for turning same so as to lock the turntable 6 at any desired point on the column to which same has been adjusted by means of the screw nut 9 which is revolved by any suitable means (such as a spanner or lever) upon the screwed portion of the exterior of the column 2—see Fig. 2. On the upper part of this vertical column 2 there is mounted a cross-head or head-part 10 upon which are rotatably mounted the vertically disposed plates or supports 11 and 12 on the outer faces of each of which plates 11 and 12 respectively is mounted the two parts forming the parison mold 13 and the two parts forming the neck mold 14 and also pneumatically operated means on each said plate or support 11 and 12 respectively for opening and closing these two-part molds 13 and 14 respectively thereon and the nozzle device 15 carrying the mandrel through which the air is supplied for blowing the bottle and which nozzle device 15 also carries the core or mandrel and means for operating same for the formation of the opening of the bottle and forming the interior of the neck of the bottle.

Air under pressure from any suitable source is admitted through the pipe 16 (Fig. 2) and passes through the pipe 17 to the nozzle which blows the bottle in the mold parts on the plate 11 and through the pipe 18 to the nozzle which blows the bottle in the mold parts on the plate 12; and furthermore air from this supply is led through the pipes 19 and coiled portion 20 see Figs. 1 and 2 and pipes 21 (each controlled by a valve 22) to the cylinders 23 and 24 respectively which latter cylinders cause or permit the closing or opening of the parts of the finishing molds on the table 6 as hereinafter described.

Referring now more particularly to Fig. 3:—the air coming from the conduit 17 (Fig. 2) for blowing the bottle is controlled by the hand valve 25 and passing into the annular chamber 26 thence enters and passes down the central passage 27 in the screwed portion 28 of the spindle 29, which spindle at one end carries the air nozzle 30 which latter constitutes the core or mandrel for forming the opening in the neck of the bottle and also for forming the interior of the neck of the bottle, while the other end of this screwed spindle 28, 29, has attached thereto the hand wheel 31 by which said core or mandrel 30 is inserted into and withdrawn from the mouth and neck portion of the bottle. For convenience of the operator in opening and closing the air conduit 17 into the annular chamber 26 as aforesaid a double hand valve 25 may be provided (see Fig. 3) namely a small hand wheel 25 is affixed at each end of the valve spindle extending on opposite sides of the passage 17 see Fig. 3.

Each half of the neck mold 14 is formed of two portions, each marked 14 in Fig. 3, the said two portions being fixedly attached to one another so as to form the half portion of the mold in one piece—one part of which embraces and fits the molded nozzle portion 32 of the nozzle device 15, while the other part is shaped so as to impart the desired form of the head and neck portion of the bottle to be molded a suitable interior form of said neck mold 14 being shown in Fig. 3.

Each half of the parison mold 13 is pivoted independently to a vertical pivot or hinge-pin 33 see Fig. 5 one half of the parison mold 13 having a toothed quadrant or sector-like portion 34 thereon, the other half having a similar toothed quadrant or sector-like portion 35 fixed thereto. The teeth of the sector 34 attached to one half of the mold 13 as aforesaid are in engagement with the teeth 36 forming a rack on the intermediate part of the double-ended piston 37 (see Fig. 5) which end portions of the piston are acted on by the air in the closed end portions of the pneumatic cylinder 38; while the teeth on the sector 35 gear with the teeth on a similar piston in a similar cylinder 39. Similarly each half-portion of the neck mold 14 has a toothed quadrant or sector which engages with racks or teeth on similar pistons—the ends of which latter work in the closed end portions of similar cylinders 40 and 41.

The conduit 17 (Fig. 2) is in constant communication also with the pipes 42 and 44 respectively hereinafter described.

It will of course be necessary to always close the two halves of the neck mold 14 upon the nozzle device 15 before closing the two halves of the parison mold 13—as the latter have to be closed upon and embrace part of the closed neck mold parts 14, and thereafter it is necessary to first open the two halves of the parison mold 13. For this purpose, and to operate the pistons in the pneumatic cylinders 40, 41 and 38, 39; and in the proper sequence and in proper directions; the air coming through the conduit 17 (Fig. 2) is conducted through the pipe 42 (Fig. 3) to the rotatable valve 43, and thence to the cylinders 38 and 39 as hereinafter described in greater detail and through the pipe 44 to the rotatable valve 45 and thence to the cylinders 40 and 41. Taking now the valve 43; as will readily be seen this valve in the position shown in Fig. 3 will admit the air pressure from pipe 42 through the passage 46 to the port 47 in the valve 43 (when in the position as shown in this Fig. 3 of the drawings) and thence through the passage 48 to the cross pipe 49 which leads to one end of the cylinder 38 and to the opposite end of the cylinder 39, and if now the halves of the parison mold are in the open position as shown in Fig. 6 the air pressure acting in the right hand end of the cylinder 38 will force the piston along the cylinder and so close the half of the parison mold 13 attached to the sector 34, while the oppositely disposed piston in the cylinder 39 will be forced from the other end of said cylinder (i. e. in the opposite direction to the piston 37) and so simultaneously close the other half of the parison mold 13; so that the two halves are thus moved into the closed position as shown in Figs. 2, 3 and 5. In order to open the halves of the parison mold the valve 43 is now given a quarter turn with the result that the part 47 in said valve now puts the passage 50 in communication with the passage 46, and thus the air pressure from the pipe 42 passes through passage 46, port 47 (in this altered position) and passage 50 into the cross-pipe 51 which in one direction leads to the opposite end of the cylinder 39 to that to which the pipe 49 leads, and this pipe 51 in the other direction leads to the end of the cylinder 38 opposite to the end thereof to which the pipe 49 leads; and on air being thus admitted to the pipe 51, the pistons in the cylinders 38, 39 are now each forced in the opposite direction and thereby force open the two halves of the parison mold 13 into the position shown in Fig. 6. When air is admitted through pipe 49 then the air in the opposite end of the cylinders 38, 39, can escape through the pipe 51, passage 50, port 52 and passage 53 and vice-versa, when air pressure is admitted through the pipe 51, the air in the opposite end of the cylinder can escape through the pipe 49 and thence through the passage 48, open port 52 in the valve and open passage 53. The valve 45 and its passages and connections is identical with the valve 43, and admits air either through the pipe 54 to one end of the cylinder 40 and to the other end of the cylinder 41, or admits air through the pipe 55 to the opposite ends of these respective cylinders. In order to insure the working in proper sequence of these pneumatic means for closing the parison mold and vice-versa; the handle 56 by which the valve 43 is operated and the handle 57 by which the valve 45 is operated may be set to such an angle to one another and so connected by a cross-bar or tie-bar 58 (see Fig. 4) that on turning either said handle 56 or 57 the valve 45 will be opened in advance of the valve 43 so as thus to close the neck mold in advance of the parison mold, while on the other hand the handles 56 or 57 can be moved in reverse direction for a sufficient distance so as to only reverse the valve 43 and open the parison mold when desired while leaving the neck mold remaining in the closed position.

If desired similar pneumatic means may be provided for imparting reciprocatory rotary movement through half of a circle to each vertical plate or support 11 and 12 respectively carrying the neck and parison molds as aforesaid; a suitable arrangement of such pneumatic means being shown in Figs. 12 and 13 in which the trunnion or collar 59 on the back of each said plate or vertical support 11 and 12 respectively is provided with a toothed sector or partial ring of teeth to each of which latter gears with teeth 61 on a double-ended piston 62 in a pneumatic cylinder 63 fixed to the frame of the machine; so that by means of a valve air can be admitted when desired to either end of this cylinder 63 and thus impart each rotary movement through half a circle to each said plate 11 and 12 respectively; or the latter may simply be provided with a radially extending handle or handles 64 by which each said plate 11 can be rotated (through half a circle) by hand.

Referring now more particularly to Fig. 11:—in this arrangement, instead of the air supply from the air inlet supply pipe 16 passing through the pipes 19, coils 20 and pipes 21 to the cylinders 23 and 24 for operating the finishing molds, the air supply is brought direct through the hollow central vertical spindle 2 to the lower portion thereof whence it is drawn off through an air-tight annular collar fitting the exterior of said lower portion of this column 2 in an air-tight manner and from this collar the air is conducted through the pipes 21 to the respective cylinders 23, 24—as shown in said Fig. 11.

Referring now to the drawings generally:—the finishing molds in two half parts 65 (having any suitable interior form) supported on the work-table 6 on which they are mounted (in the arrangement shown in Figs. 1, 2, 7 and 8) by the lower end of each half part being pivoted or hinged to a horizontally disposed pivot or hinge-pin 66 e. g. the under-portion of each mold part 65 may be provided with lugs or brackets adapted to turn on said horizontal pins 66 and also each mold part 65 provided with a laterally extending pin 67 to each of which is pivoted one end of one of the toggle levers or links 68 each said lever or link 68 being pivoted at 69 to the end of the piston rod 70 carried on the piston 71 operating in and operated by the pneumatic cylinder 24 or 23 supported on the under-side of the work-table 6 and supplied with air under pressure through the pipe 21 (e. g. either as shown in Figs. 1 and 2 or in Fig. 11) as aforesaid. When the mold is in the open position as shown in Fig. 8 and at the left-hand side of Fig. 2 the piston 71 is at or near the bottom of the cylinder 24; and on admitting air under pressure through the pipe 21 said piston is forced up and thereby, as will readily be seen, will force the two parts 65 of the finishing mold from the open position shown in Fig. 8 into the closed position shown in Fig. 7 and as shown at the right hand side of Fig. 2. Air is separately and independently supplied—by a separate independent pipe 21—to the cylinders 23 and 24 as and when desired and each supply controlled by a separate valve such as 22. When it is desired to open the finishing mold the air supply is cut off from the cylinder and the air therein allowed to escape and thereupon the mold parts 65 will readily swing open and may be either assisted by hand or assisted by pneumatic means if desired.

Referring now to Figs. 9 and 10:—as many glass bottle manufacturers have large stocks of finishing molds of the ordinary vertical hinged type—such as illustrated in Figs. 9 and 10—it is of great importance to render it possible to utilize such existing finishing molds of this said type, and this machine has the advantage that it enables such existing finishing molds with vertical hinges to be adapted for use in this machine, and to be operated (opened and closed) by pneumatic means in a similar manner to the finishing mold described and illustrated with reference to Figs. 1, 2, 7 and 8. These Figs. 9 and 10 therefore illustrate the said ordinary vertical hinged type of finishing mold (from which the vertical hinge-pins have been removed and dispensed with) the two parts of these finishing molds being arranged and adapted to be hinged upon horizontal hinge-pins in a similar manner to the mold parts 65 shown in Figs. 7 and 8 and these mold parts (Figs. 9 and 10) can readily be provided with lugs or laterally extending pins 67 (as in Figs. 7 and 8) and connected by means of links or toggle levers 68 to the piston rod 70 (as in Figs. 2, 7 and 8) and thereby these mold parts (Figs. 9 and 10) can be mechanically operated so as to open and close same (in a vertical plane) to form the finishing mold as aforesaid; and thus enable existing finishing molds of the aforesaid vertical hinged pattern to be adapted and used on this machine.

The supporting column 2 of the apparatus (with the work-table 6 and the vertical supports or plates 11 and 12 with the molds thereon) rotates readily on the foot 1 of the machine—advantageously on the ball bearings as aforesaid.

The operative is able to operate the molds in succession and has merely to exert a slight effort in order to bring the various molds into position.

The plates 11 and 12 are provided with means for setting them (as for example the self-acting spring bolts or latches 72, Fig. 2 which act automatically at the end of one-half turn and stop-blocks or stop-pieces 73 which at the end of the opposite half-turn come to rest against fixed stops carried on the machine) so that the neck mold 14 and the hopper-shaped parison mold 13 always set themselves and are held in vertical alinement and are located relatively to the nozzle device 15 in such a manner that the latter is either below the neck mold 14 and the parison mold 13 above the latter, or over these molds 13 and 14. The nozzle device 15 of each of the plates 11 and 12 is supplied with compressed air through the hollow shaft on which these plates are mounted and to which the compressed air is constantly supplied.

When desired to form bottles with an internal screw thread in the neck of the bottle the end 30 of the spindle 29 is formed screw-threaded in suchwise that when the spindle is screwed in after the glass molds have been filled the necks of the bottles formed are thus internally screw-threaded.

The two parts of the two molds 13 and 14 respectively may be adjustably mounted on the rotatable plates 11 and 12 respectively, or may be made adjustable upon the supports by which they are mounted on said plates 11 and 12 respectively. The work-table 6 is also arranged in such a manner that it is able to receive finishing molds of different widths or height so that hollow glass articles of different width or height may be formed on this machine.

The operation of this glass blowing machine is as follows:—One of the vertical supports or plates 11 or 12, say for example the plate 11 is rotated or adjusted in such a manner that the neck mold parts 14 in the open position are located above the nozzle device 15 while the hopper-shaped parison mold parts 13 in the open position are located above and adjacent to said open head mold parts 14. By now opening the air valve 45 (Fig. 3) as for example by means of either of the connecting valve lever handles 56 or 57 air pressure is admitted to the cylinders 40 41, so as to quickly close the parts of the neck mold 14, as before described, and cause same to fit tightly upon the molded part 32 of the nozzle device 15 as before described; and immediately thereafter by similarly or otherwise turning the valve 43 (Fig. 3) air is admitted to the pneumatic cylinders 38 and 39 and thereby the parts of the parison mold 13 are quickly closed and fit over part of the exterior of the neck mold against which they fit tightly; so that with the parts of the molds 13 and 13(?)

14 thus closed, and in the position shown in Fig. 3 and in the left hand of Figs. 1 and 2, the combined mold thus formed is ready to receive the charge of molten glass through the open upturned end of the parison mold the nozzle 30, forming the core or mandrel, being screwed back or otherwise withdrawn out of the mold chamber thus formed or not as desired. A suitable quantity of glass in a suitable molten condition can then be placed into the combined mold thus formed for example said combined mold may be filled up to about two-thirds or three-fourths of the height of the internal chamber formed in said combined mold see Fig. 3; the screw spindle 28, 29, is then rotated by the hand wheel 31 so as to project the nozzle end 30 (through which the air for blowing the bottle, etc., is subsequently introduced through the central passage 27) into the molten glass in the neck mold, thereby forming the opening in the bottle neck, and thereupon compressed air is admitted by opening the valve 25 through the nozzle passage 27 into the interior of the mass of glass which is thereby blown into a "ball" or so-called "parison"; and thereupon the air supply is cut off again by the valve 25 all these operations being performed while the molds remain in the position shown in Fig. 3 and the left-hand side of Fig. 2. The ball or parison having thus been formed and the finishing mold having been placed in the open position below said combined mold parts, as shown in the left-hand side of Fig. 2, and everything being in readiness, the air valve controlling the air supply to the pneumatic cylinders 38, 39, is then reversed or so operated as to cause the pneumatic pistons in said cylinders to quickly open and lay right back (out of the way) the two halves of the parison mold 13—thus leaving the ball or parison in the inverted position with the neck or mouth portion of this ball or parison forming the partly made bottle (or other article which is being blown) still held in the neck mold whereupon the vertical support or plate 11 is now rotated through 180° and then brought to rest, thus swinging, by the neck, the partly formed bottle (or so-called "ball" or "parison") around or through half a circle and so that it now hangs below and is suspended by the neck, and as the molten mass now tends to elongate itself the operator opens the valve 22 controlling the admission of air to the cylinder 23 which thereupon quickly closes the two halves of the finishing mold upon and around and so as to completely inclose the said "ball" or "parison"; the finishing mold 65 being so adjusted and arranged to fit closely or sufficiently closely against the neck mold; or if desired the parts 65 of said finishing mold may surround and inclose a part of the exterior of the neck mold 14.

With the combined mold thus formed by the closed parts of the finishing mold 65 and neck mold 14 (as shown at the right hand side of Fig. 2) further supply of compressed air is then admitted, by again opening the valve 25, through the nozzle passage 27 to the interior of the partly made bottle, to thereby blow the ball or parison into a finished bottle or other hollow glass article. When this blowing operation is finished thereupon the valve 25 is closed to prevent further air supply. Next the core or mandrel is drawn back out of the neck of the bottle by screwing or otherwise; and if it is a screw-neck bottle this withdrawal is effected by screwing said core or mandrel back (or backward and forward) with the screw 28 (on the spindle 29) of the same pitch as the screw (on the nozzle-end 30) to be imparted to the interior of the neck of the bottle. A partial turn is now (either before or after opening the neck mold) imparted to the horizontal table 6 so as to thereby carry around the molds just used away from the operator and into position for a boy or other attendant to subsequently remove the newly blown bottle out of the mold; and at the same time this rotation of the table 6 and head-stock 10 of the machine will bring into position, before the operator, the other vertical support or plate with a fresh set of molds thereon, and a fresh finishing mold on the table 6 so that, while the bottle just made still remains in the former finishing mold, the operator can commence operations for blowing the next bottle, for which purpose, the charge of glass can be immediately placed in the combined mold formed by the parison mold 13 and head mold 14 (on the disk or support 12) which are of course moved into the closed and up-turned position as shown in Fig. 3 and the left-hand of Fig. 2 for receiving the charge of glass; and during the time this next molding and blowing operation is being carried out the last finished bottle can remain in its mold and the latter can be opened and the bottle removed just prior to the completion of this second blowing operation and so on. Thus the output from the machine is very considerable.

When the blowing of each bottle is finished same may, if desired, be left standing (during part of the next blowing operation) in the finishing mold alone i. e. after the core or mandrel and neck mold have been withdrawn therefrom, so as thus to afford more time for these parts to cool off and consequently the air nozzles do not become unduly heated and the manipulation of the machine is greatly simplified, while obviating the operator having to wait for the cooling off of these parts. Or if desired any suitable cooling means may be added or any suitable provision may be made for specially cooling any of the parts as desired. When the finishing mold has been opened (by the means hereinbefore described or any other suitable means) the finished bottle is removed and placed in an oven or subjected to the usual or any suitable treatment subsequent to the blowing operation.

If desired, instead of opening the parison mold after the preliminary blowing operation as before described and swinging the ball or parison while held only by the neck portion through half a circle as aforesaid; the said parison mold parts may be allowed to remain closed around the partly blown bottle (ball or parison) while the plate 11 (or plate 12) and the said closed molds 13 and 14 thereon (with the partly blown bottle, etc., therein) are rotated or turned through 180° as aforesaid; and thereafter the parison mold parts 13 may be opened and laid back out of the way, by pneumatic means as aforesaid, and then the finishing mold closed around the molten glass forming the ball or parison and the blowing operation then finished as aforesaid.

The neck mold parts and the parison mold parts may be respectively so mounted on the vertical supports or plates, such as 11 and 12, as to be readily changed (or adjusted as aforesaid) when desired; and similarly with the finishing mold parts on the turn-table 6.

Owing to the fact that the opening and closing of the molds and also the blowing of the ball or parison in the parison mold and the final blowing operation for blowing the bottle (or other article) in the finishing mold takes place under air pressure, the various operations of this glass blowing machine are purely mechanical and consequently can easily be effected by any competent person whether versed in the art of glass blowing or not.

Although the present invention has been described and illustrated more particularly with reference to a double machine arranged to rotate around a vertical axis nevertheless other forms of machine may be employed without departing from the spirit and the scope of this invention as for example I may employ other than two vertical plates or supports such as 11 and 12 each provided with its set of neck and parison mold parts thereon and pneumatic means for operating said mold parts (for example instead of a double machine as illustrated I may arrange a quadruple machine) and I may arrange corresponding or other suitable number of finishing molds to coöperate with the said neck and parison molds and also any such machine may be arranged to reciprocate in a horizontal plane only partly around its vertical axis.

The pneumatic cylinders 23 and 24 for opening and closing the finishing molds—instead of being arranged to one side of as well as below the finishing molds as shown in Figs. 1 and 2—may if desired be arranged directly underneath the finishing molds (i. e. arranged on the underside of the table 6 directly below said finishing molds) with suitable connecting gear to open and close the parts of the finishing molds.

This machine does not require any driving power to set it—with the finishing molds and the work-table—in motion. Furthermore it does not necessarily require a specially divided finishing mold; but on the contrary the molds hitherto used in hand-blowing can be employed. In order to open and close the neck and parison and finishing molds air is or can be used from one and the same source as that used for blowing the bottle.

The construction of this glass blowing machine is so designed that the various machine parts are connected with each other without spring pressure, and without telescopic elongations, and in such a way that by merely operating the air distribution valves the opening and closing of the molds and the blowing of the glass mass are effected. Also so far as I am aware, there is no previous machine employing a work-table rotating about a vertical shaft and on which the finishing molds are present in plural number, wherein there are arranged for the finishing molds a like number of parison and neck molds on plates or supports (such as the disks 11 and 12) rotatable in a vertical plane and located above the finishing molds.

What I claim is:—

1. In a machine for blowing glass bottles or the like hollow objects—the combination with a neck mold having half parts to each of which is connected a toothed sector gearing with a rack adapted to be reciprocated and pneumatic means for imparting such reciprocatory action to said rack substantially as and for the purposes set forth.

2. In a machine for blowing glass bottles or the like hollow objects—the combination with a parison mold having half parts to each of which is connected a toothed sector gearing with a rack adapted to be reciprocated and pneumatic means for imparting such reciprocatory action to said rack substantially as and for the purposes set forth.

3. In a machine for blowing glass bottles or the like hollow objects—the combination of a neck mold and a parison mold each made in halves, each half having connected thereto a toothed sector gearing with a rack adapted to be reciprocated and pneumatic means for imparting such reciprocatory action to said rack substantially as and for the purposes set forth.

4. In a machine for blowing glass bottles or the like hollow objects—the combination of a neck mold made in halves, each half having a toothed sector, a separate rack for each such sector—formed on the intermediate part of a double-ended piston adapted to be reciprocated, and pneumatic means to impart reciprocatory motion to said piston, substantially as and for the purposes set forth.

5. In a machine for blowing glass bottles or the like hollow objects—the combination with movable parts of a parison mold made in parts of a toothed sector, a separate rack for each such sector—formed on the intermediate part of a double-ended piston adapted to be reciprocated, and pneumatic means to impart reciprocatory motion to said piston, substantially as and for the purposes set forth.

6. In a machine for blowing glass bottles or the like hollow objects—the combination with a neck mold and a parison mold made in halves each half provided with a toothed sector, a separate rack for each such sector—formed on the intermediate part of a double-ended piston adapted to be reciprocated, and pneumatic means to impart reciprocatory motion to said piston, substantially as and for the purposes set forth.

7. In a machine for blowing glass bottles or the like hollow objects—the arrangement on each half part of the neck mold and parison mold respectively of a toothed sector gearing with a rack operated reciprocally by pneumatic means in combination and arranged to act in conjunction with a finishing mold each half part of which latter is arranged and mounted in suchwise as to enable each such part to swing or turn upon a horizontal axis to open and close such finishing mold, pneumatic means for operating said finishing mold parts, and means connecting the latter to the former, all substantially as and for the purposes set forth.

8. In a machine for blowing glass bottles or the like hollow objects—the arrangement on each half part of the neck mold and parison mold respectively of a toothed sector, a separate rack—for each such sector—formed on the intermediate part of a double-ended piston adapted to be reciprocated pneumatically and pneumatic means to operate said rack, in combination and arranged to act in conjunction with a finishing mold each half part of which latter is arranged and mounted in suchwise as to enable each such part to swing or turn upon a horizontal axis to open and close such finishing mold, pneumatic means for operating said finishing mold parts and means connecting the latter to the former all substantially as and for the purposes set forth.

9. In a glass bottle blowing machine having several sets of neck molds, parison molds, and finishing molds, the arrangement of each set of neck and parison molds on a vertically disposed disk or support rotatable in a vertical plane in combination with means to automatically hold fast said rotatable disk or support in each limit position to which it is desired same should be rotated, pistons having the end portions arranged to be acted on by air pressure in cylinders and the central portion provided with rack teeth, sectors engaging with said racks, arms attached to said sectors and connected to the respective parts of the mold, air distribution valves, and conduits connecting same with the air cylinders, said air distribution valves being connected and arranged in suchwise that air is first admitted to close the neck mold parts and next the parison mold parts and vice-versa when said valves are reversed and one or more finishing molds for each said set of neck and parison molds, the said finishing molds being disposed on a work-table rotatable horizontally, and pneumatic means for closing the halves of said finishing mold, all substantially as and for the purposes set forth.

In witness whereof I have hereunto set my hand in presence of two witnesses.

LUDWIG GROTE.

Witnesses:
HENRY BIRKBECK,
H. D. JAMESON.

---

Copies of this patent may be obtained for five cents each, by addressing the "Commissioner of Patents, Washington, D. C."